Nov. 1, 1927. 1,647,699
A. O. HOEFTMANN
CABLE JOINT
Filed April 11, 1924   2 Sheets-Sheet 2
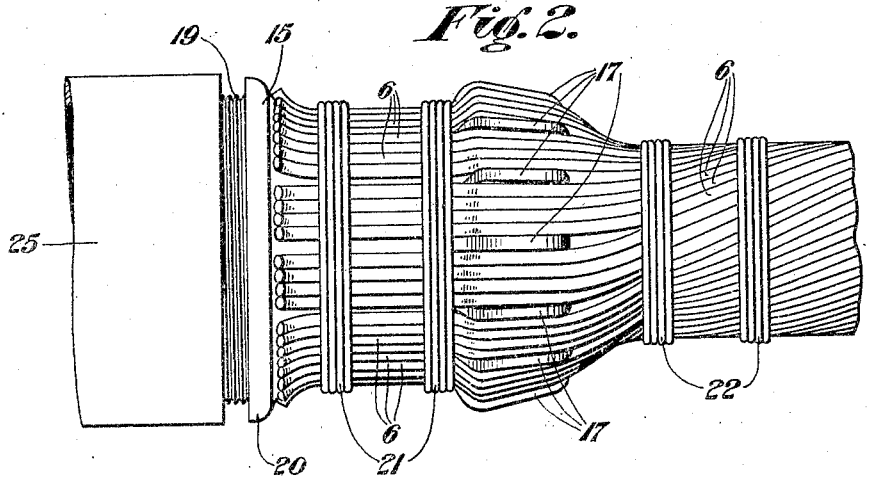
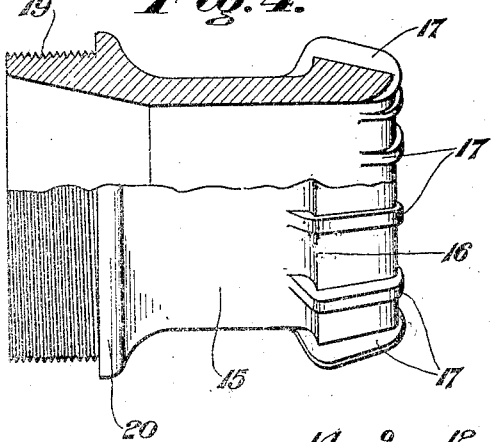
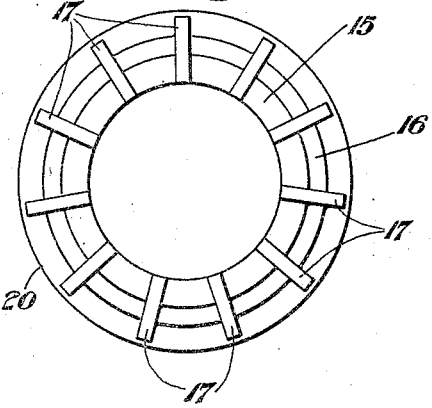
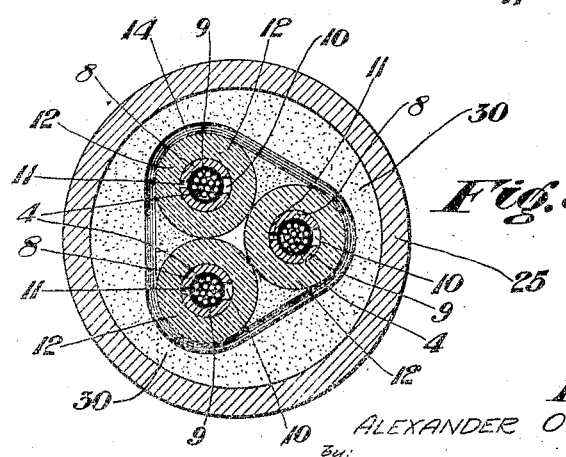
Inventor:
ALEXANDER O. HOEFTMANN Patented Nov. 1, 1927.

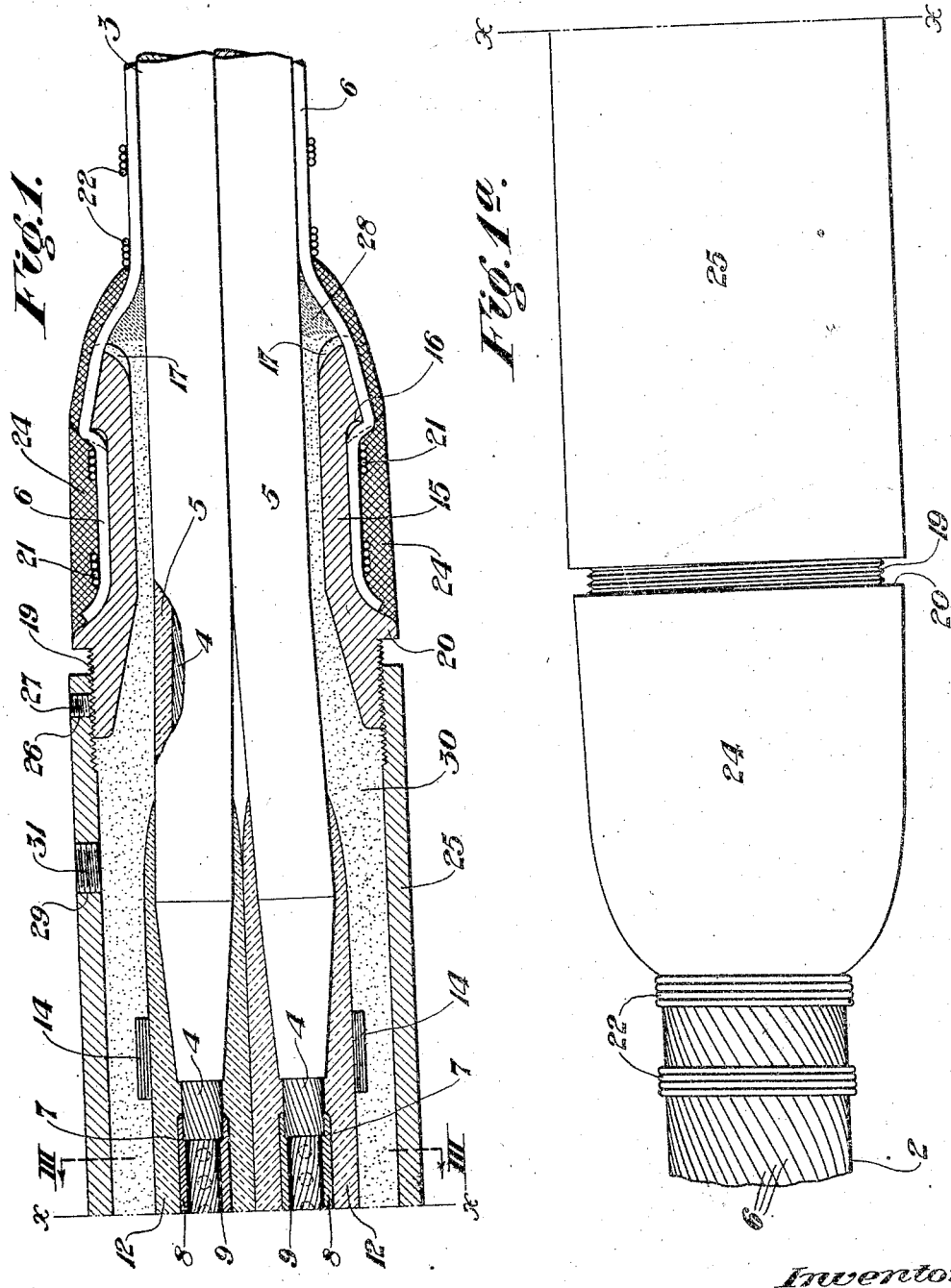

1,647,699

UNITED STATES PATENT OFFICE.

ALEXANDER O. HOEFTMANN, OF WORCESTER, MASSACHUSETTS, ASSIGNOR TO THE AMERICAN STEEL AND WIRE COMPANY OF NEW JERSEY, A CORPORATION OF NEW JERSEY.

CABLE JOINT.

Application filed April 11, 1924. Serial No. 705,830.

This invention relates to cable joints, and more particularly to joints for armored electric cables of the submarine type, and has for its object to provide a more simple and substantial joint than heretofore used.

Previous methods of forming armored cable joints have made use of brazing or welding the armor to a metal tube, which requires excessive heat and somewhat complicated apparatus in order to perform the operation. Such excessive heat is injurious to the insulation of the conductors within the cable. Furthermore, such apparatus as is necessary to form such joints is not always available nor adaptable under existing cable laying conditions.

The present invention provides a joint that may readily be made with the use of simple apparatus, and no excessive heat is developed to injure the cable insulation.

In the drawings, Figures 1 and 1ª show a complete joint, one-half being in section for purpose of clearness.

Figure 2 is a side elevation of one end of a joint, showing the armor wires secured to the sleeve before the molten metal is applied thereto.

Figure 3 is a transverse section on the line III—III of Figure 1.

Figure 4 is a side elevation partly in section of one of the coupling sleeves.

Figure 5 is an end view thereof.

Referring more particularly to the drawings, the numerals 2 and 3 designate the ends of the cable which are joined. The cables 2 and 3 are of the usual well known wire armored type, comprising a plurality of conductors 4 encased in insulation 5 and armored and bound together by wires 6.

The ends of the conductors 4 have the insulation removed and are stepped down, as at 7, to receive the conductor connecting sleeves 8. The sleeves 8 are composed of copper and are of a slightly greater diameter than the conductors 4, so as to provide clearance for molten solder 9 which is poured into the sleeves 8, after they are secured on the conductors, through pour-holes 10. The sleeves 8 are also provided with holes 11 at diametrically opposite points from the holes 10 and of a much smaller diameter than the holes 10, these holes being for the purpose of allowing the escape of air from the sleeves 8 when pouring the solder, and thereby permitting the formation of a more perfect joint.

The original insulation 5 on the conductors 4 is removed or pared away in baring the conductors for the mounting of the sleeves 8. Therefore, after the sleeves are secured in place a quantity of new insulation 12 is formed around the conductors and sleeves to electrically separate the several conductors.

A suitable tie and spacing collar 14 is provided to hold the several conductors in assembled position during the completion of the joint.

A sleeve 15 is mounted around each cable being joined, at a point slightly back from the end thereof. The sleeves 15 are provided at their rear ends with a peripheral shoulder 16, the upper face of which tapers downwardly and rearwardly. A plurality of longitudinally extending flanges or ribs 17 are provided on the shoulder 16 and serve as spacing members for the armor wires of the cable. The ribs 17 also prevent sidewise movement of the armor wires on the sleeve. The forward end of the sleeve 15 is provided with a screw thread flange 19, which terminates at its inner end in a shoulder 20.

The armor wires 6 are passed over the sleeve 15 and are provided with seizing wires 21 on the sleeve 15 between the shoulders 16 and 20 to firmly connect the parts. Other seizing wires 22 are at a point on the cable just beyond the sleeve 15 to hold the wires firmly against the shoulder 16.

In order to complete the joining of the sleeve 15 with the cable armor and the forming of a secure and water-tight connection, a quantity of molten zinc, babbitt, or the like, is moulded around the sleeve 15 and armor wires 6, as at 24, so as to integrally unite these parts.

After the sleeves 15 are secured in position they are connected to complete the joint by a tubular connecting member 25, having left and right hand threaded ends adapted to be screwed onto the screw threaded flanges 19 of the sleeves 15. The member 25 is adapted to be screwed up on the flanges 19 until the sleeves 15 are drawn toward each other a sufficient distance to remove all strain from the sleeve connections 8 connecting the conductors 4.

The connecting member 25 is provided with screw threaded apertures 26 adjacent each end for the reception of suitable locking set screws 27, which are adapted to bear against the threaded flanges 19 of the sleeves 15 and thus prevent the unscrewing or loosening of the connecting member.

The joint as so far described may be considered complete. However, to increase its service and utility I prefer to add a filling of insulating compound 30 within the member 25 and sleeves 15. In order to fill this compound within the connecting member 25 and sleeves 15, I provide a filling of jute, asbestos, or the like 28 between the armor wires 6 and conductors when fastening the wires 6 to the sleeves 15, and also provide a pour-hole 29 in the member 25, through which the compound 30 may be poured in a molten state to completely fill the space between the conductors and connecting members. The pour-hole 29 is closed, after the compound has been poured into the joint, by a screw threaded plug 31.

The joint is of duplicate construction on each side of its transverse center and, therefore, it will be understood that the parts shown in section in Figure 1 are duplicated on the other side of the transverse center line which is shown in elevation.

Joints constructed in accordance with this invention have many advantages over the prior art. They are stronger, are easily made without the use of skilled mechanics, or complicated or expensive apparatus, and, due to their peculiar shape, they are readily adapted for passage over a sheave roller or the like.

While I have shown and described only one specific embodiment of my invention, it will be understood that I do not wish to be limited thereto, since various modifications may be made without departing from the scope of my invention as defined in the appended claims.

I claim—

1. A joint for use with wire armored electric cables, comprising means for connecting the conductors of said cable, a sleeve member mounted on each of the cable ends to be joined, said sleeve members being each provided with a circumferential recess terminating at its rear end in a square shoulder, the armor wires of said cable ends being positioned on said sleeves and depressed into said recess so as to form a sharp bend over said shoulder, seizing wires secured around the portion of said armor wires depressed in said recess for holding said armor wires in position, other seizing wires secured around said armor wires immediately beyond the rear ends of said sleeves to force said armor wires against said square shoulder on said sleeve, said sleeves, said armor wires and said seizing wires around the portion of said armor wires depressed in said recess, all being secured together by a body of metal formed around said sleeves and wires in a molten state, and means for adjustably securing said sleeves together.

2. A joint for use with wire armored electric cables, comprising means for connecting the conductors of said cable, a sleeve member mounted on each of the cable ends to be joined, said sleeve members being each provided with a circumferential recess terminating at its rear end in a square shoulder, the armor wires of said cable ends being positioned on said sleeves and depressed into said recess so as to form a sharp bend over said shoulder, seizing wires secured around the portion of said armor wires depressed in said recess for holding said armor wires in position, other seizing wires secured around said armor wires immediately beyond the rear ends of said sleeves to force said armor wires against said square shoulder on said sleeve, and a tubular connecting member having a screw threaded connection with each of said sleeve members for adjustably securing said sleeve members together.

3. A joint for use with wire armored electric cables, comprising means for connecting the conductors of said cable, a sleeve member mounted on each of the cable ends to be joined, said sleeve members being each provided with a circumferential recess terminating at its rear end in a square shoulder, the armor wires of said cable ends being positioned on said sleeves and depressed into said recess so as to form a sharp bend over said shoulder, said sleeves and said armor wires being secured together by a body of metal formed around said sleeves and wires in a molten state, and a tubular connecting member having a screw threaded connection with each of said sleeve members for adjustably securing said sleeve members together.

4. A joint for use with wire armored electric cables, comprising means for connecting the conductors of said cable, a sleeve member mounted on each of the cable ends to be joined, said sleeve members having a materially larger internal diameter than the diameter of said cable ends and being each provided with a circumferential recess terminating at its rear end in a square shoulder, the armor wires of said cable ends being positioned on said sleeves and depressed into said recess so as to form a sharp bend over said shoulder, seizing wires secured around the portion of said armor wires depressed in said recess for holding said armor wires in position, other seizing wires secured around said armor wires immediately beyond the rear ends of said sleeves to force said armor wires against said square shoulder on said sleeve, a tubular connecting member having a screw threaded connection with each of said sleeve members for drawing said sleeves toward each other to complete the joint, said member being provided with a relatively small opening in its side wall and a body of insulating material between said sleeves and said tubular connecting member and said cable ends, said insulating material being adapted to be poured into the space between said sleeves and tubular connecting member and said cable ends through said small opening in the side wall of said tubular connecting member after said joint is assembled.

In witness whereof I have hereunto signed my name.

ALEXANDER O. HOEFTMANN.